United States Patent
Kespohl et al.

(10) Patent No.: US 7,133,706 B2
(45) Date of Patent: Nov. 7, 2006

(54) MOBILE COMMUNICATION DEVICE HAVING A KEYBOARD INCLUDING A KEYPAD

(75) Inventors: Klaus Kespohl, Bochum (DE); Karsten Lehn, Kamen (DE); Matthias Jobst, Bochum (DE); Stefanie Völlinger, Essen (DE); Konrad Brisse, Hattingen (DE); Peter Buth, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/516,873

(22) PCT Filed: Jun. 12, 2002

(86) PCT No.: PCT/IB02/02160

§ 371 (c)(1),
(2), (4) Date: Dec. 3, 2004

(87) PCT Pub. No.: WO03/107165

PCT Pub. Date: Dec. 24, 2003

(65) Prior Publication Data

US 2005/0202840 A1    Sep. 15, 2005

(51) Int. Cl.
*H04M 1/00*    (2006.01)
(52) U.S. Cl. ............... 455/575.1; 455/566; 455/550.1; 345/168
(58) Field of Classification Search ........... 455/550.1, 455/575.1, 575.8, 566, 90.3; 345/160, 168, 345/172
See application file for complete search history.

(56) References Cited

U.S. PATENT DOCUMENTS

| | | | | |
|---|---|---|---|---|
| 5,476,332 A | * | 12/1995 | Cleveland, Jr. | 400/486 |
| 5,727,047 A | * | 3/1998 | Bentley et al. | 379/93.05 |
| 6,047,196 A | * | 4/2000 | Makela et al. | 455/556.1 |
| 6,377,811 B1 | * | 4/2002 | Sood et al. | 455/464 |
| 6,571,086 B1 | * | 5/2003 | Uusimaki | 379/368 |
| 6,622,025 B1 | * | 9/2003 | Lee | 455/550.1 |
| 6,728,558 B1 | * | 4/2004 | Kubo et al. | 455/575.4 |
| 6,867,965 B1 | * | 3/2005 | Khoo | 361/686 |
| 2002/0006815 A1 | | 1/2002 | Finke-Anlauff | 455/575 |
| 2002/0044136 A1 | | 4/2002 | Griffin et al. | 345/169 |

FOREIGN PATENT DOCUMENTS

| | | |
|---|---|---|
| EP | 0933908 A2 | 8/1999 |
| WO | WO 95/12841 | 5/1995 |
| WO | WO 01/31897 A1 | 5/2001 |

* cited by examiner

*Primary Examiner*—Charles Appiah
*Assistant Examiner*—Nghi H. Ly

(57) ABSTRACT

The present invention relates to a mobile communication device having a keyboard and a method for controlling the operation of the keyboard of such a mobile communication device. The keyboard provides a QWERTY styled layout including a keypad similar to a ITU-T keypad.

Applications executed on the mobile communication device are adapted to switch an operation mode of the keyboard such that in accordance with a certain expected information input, different assignments of the keys of the keyboard are active. The keyboard operation modes improve the usability of the keyboard and allow the number of total keys for operating the mobile communication device to be reduced resulting in lowered cost of manufacture.

4 Claims, 2 Drawing Sheets

MOBILE COMMUNICATION DEVICE HAVING A KEYBOARD INCLUDING A KEYPAD

CROSS-REFERENCE TO RELATED APPLICATION

This application is the U.S. National Stage of International Application Number PCT/IB02/02160 filed Jun. 12, 2002 and published in English Dec. 24, 2003 under International Publication Number WO 03/107165A1.

BACKGROUND OF THE INVENTION

1. Technical Field

The present invention relates to a mobile communication device having an alphanumeric keyboard and more specifically a mobile communication device having an alphanumeric keyboard including a keypad having a layout similar to a mobile communication device keypad.

2. Discussion of Related ArtA broad number of different keyboards is known in the art and widely used. Keyboards allow users to input alphanumeric and numeric symbols in a device, such as typewriters and today mostly personal computers and laptops. Therefore, QWERTY keyboards and national variants like the german QWERTZ keyboards have at least three staggered rows of keys primarily assigned to character signs and punctuation marks and a single row of keys arranged above which is assigned to numeric signs. An extended keyboard version includes an additional calculator style keypad assigned to numeric and mathematical signs.

The number of device applications and device functions provided by mobile communication devices to the users increase rapidly with each generation. The increasing number of device applications and device functions result from the increasing capabilities of the hardware implemented in the mobile communication devices and the demands of the user. Of course, an increasing number of device applications and device functions result in parallel in a more complex and more sophisticated handling of the total mobile communication device.

An appropriate design of the mobile communication device is a great challenge to the mobile communication device manufacturer, since partial contradictory requirements have to be fulfilled. On the one hand, the device applications and device functions should be accessed quickly and in an easily understandable fashion. On the other hand, the number of input means, especially the number of keys, is limited in order to realize a mobile communication device design of small size and low weight as well as not to confuse users due to a too high number of keys.

The double and triple assignment of keys of the keyboard to reduce the total number of keys and to minimize the total size of the keyboard is also well known. Further, especially handheld communication devices are known which have QWERTY like keyboards with integrated keypads corresponding to the conventional telephone style ITU-T keypads provided in conventional mobile phones for entering telephone numbers. Such an ITU-T keypad comprises the numbers 0 to 9 and the symbols "*" and "#" in a pre-determined standardized configuration.

DISCLOSURE OF INVENTION

The object of the invention is to provide a mobile communication device having a keyboard and a method for controlling the operation of a keyboard of a mobile communication device. The inventive keyboard offers an improved usability to a user combined with lower implementation costs for the manufacturer of the device. These improvements are obtained by advantageous double assignments of keys and an application adapted operation mode of the keyboard.

A keypad is integrated in such a way, that the signs which are employed for phone numbers comprising of the number 0 to 9, the symbols "+", "#" and "*" as well as the special characters "P" and "W" are available to a user in an adapted operation mode. The layout of the keypad is related to an ITU-T keypad and is designed such that one-handed use is possible and the geometrical memorization of the telephone numbers is still possible to the user accustomed to conventional ITU-T keypads. Further advantageously, the presented keyboard can be adapted to left-handed and right-handed use.

The objects of the invention are attained by a mobile communication device and a method for inputting alphanumeric text which are characterized by what is disclosed in detail below. Further embodiments of the invention are the subject of further disclosure.

According to an embodiment of the invention, a mobile communication device comprises a set of keys. The set of keys is arranged to form a keyboard for entering alphanumeric text. The keys of the first set of keys each have assignments, i.e. the keys have assigned letters and/or symbols to be entered by a user by operation of the respective keys. At least a subset of keys of the total set of keys of the keyboard is arranged in a pre-determined arrangement. The keys of the subset of keys each have additional second assignments, i.e. the keys have assigned letters, numbers and/or symbols to be entered by a user by operation of the respective keys. A plurality of applications are included in the mobile communication device and executed thereon.

Further, a pre-determined portion of keys is provided to the user. This portion of keys comprises a first and a second selection of keys. The first selection of keys is selected from the keys of the subset of keys having second assignments. The second selection of keys is selected from the keys of the first set of keys having assignments. The keys of the first selection allow a user to enter numbers and telephone number related symbols, whereas the keys of the second selection allow a user to enter control letters. The control letters have certain pre-defined control functions in combination with telephone numbers.

At least one of the plurality of applications included in the mobile communication device is adapted to switch a keyboard operation mode into a first mode or into a second mode. In case the keyboard operation mode is in the first mode, the set of keys and the subset of keys are operable in accordance with the first assignments and the second assignments, respectively. In case the keyboard operation mode is in the second mode, the portion of keys is operable, i.e. the keys of the first selection of keys are operable in accordance with their second assignments and the keys of the second selection of keys are operable in accordance with their first assignments. The operation of the keys of the portion of keys is limited in the second keyboard operation mode to the described assignments and preferably, the operability of the keyboard is limited to the keys out of the portion of keys in this second keyboard operation mode.

According to an embodiment of the invention, the mobile communication device comprises additionally a mode selecting key. The mode selecting key allows to switch an input mode in-between a first mode and a second mode, preferably during the first keyboard operation mode and more preferably, only during the first keyboard operation mode. In case the keyboard operation mode is in the first mode, the set of keys is operable with the input mode being in the first mode and the subset of keys is operable with the input mode being in the second mode. That is, the operation of a key of the set of keys in the first input mode leads to an entering mode in accordance with its first assignment and the operation of a key of the subset of keys in the second input mode leads to an entering in accordance with its second assignment.

According to an embodiment of the invention, the mobile communication device comprises further a keyboard controller. The keyboard controller is able to receive signals caused by the operation of a key of the keyboard as well as the mode selecting key. The keyboard controller generates commands in accordance with the received signals and transmits the generated commands to at least one of the plurality of applications expecting the command transmission and executed on the mobile communication device.

The commands are divided into several sets of commands. A first set of commands is provided in combination with the first input mode and the first keyboard operation mode, whereas a second set of commands is provided in combination with the second input mode and the first keyboard operation mode. The first set of commands represents the first assignments of the set of keys, whereas the second set of commands represents the second assignment of the subset of keys.

According to an embodiment of the invention, a third set of commands is provided in combination with the second keyboard operation mode. The third set of commands is operable with the portion of keys including the first and second selection of keys by representing the second assignments of the keys of the first selection and by representing the first assignments of the keys of the second selection.

According to an embodiment of the invention, the second assignments of the keys of the subset of keys comprise at least the numbers 0 to 9 and the symbols "+", "#" and "*". These assignments are used to define and enter telephone numbers.

According to an embodiment of the invention, the second assignments of the keys of the first selection of keys comprise at least the numbers 0 to 9 and the symbols "+", "#" and "*". These assignments are used to define and enter telephone numbers.

According to an embodiment of the invention, the control letters comprise the letters "P" and "W". The control letter "P" is entered to include a pausing operation into a telephone number, whereas the control letter "W" is entered to include a waiting operation into a telephone number.

According to an embodiment of the invention, the keyboard of the mobile communication device is substantially arranged as a QWERTY keyboard or a national variant of a QWERTY keyboard such as a german QWERTZ keyboard.

According to an embodiment of the invention, the keys of the keyboard are arranged in stacked rows.

According to an embodiment of the invention, the keyboard comprises a row including at least two space keys and two shift keys. The space and shift keys are arranged symmetrically, preferably, symmetrically to a middle axis of the mobile communication device in a top view perspective.

According to an embodiment of the invention, the keyboard comprises a row including two mode selecting keys. The mode selecting keys are arranged symmetrically, preferably, symmetrically to a middle axis of the mobile communication device in a top view perspective.

According to an embodiment of the invention, at least a variety of keys of the portion of keys are shaped different from the remaining keys of the keyboard.

According to an embodiment of the invention, at least a variety of keys of the portion of keys are colored different from the remaining keys of the keyboard.

According to an embodiment of the invention, the mobile communication device comprises a keyboard detector. The keyboard is detachably connected to the mobile communication device and includes a keyboard identification component. The keyboard identification component allows to identify the first and second assignments of the keys. Moreover, different layouts of the keyboard and/or different assignments of the keys of the keyboard are identified by the means of the keyboard identification component.

According to an embodiment of the invention, the keyboard is implemented in a cover which is at least a part of the housing of the mobile communication device. The cover is detachably connected to the mobile communication device.

According to an embodiment of the invention, the keyboard identification component is a resistant. The resistant has a certain pre-determined characteristic, i.e. preferably a certain pre-determined resistant value, assigned to a certain layout of the keyboard and certain assignments of the keys of the keyboard in order to identify uniquely a corresponding keyboard.

According to an embodiment of the invention, the detachably connected keyboard is adapted for right-handed use or for left-handed use.

According to an embodiment of the invention, a method for controlling an operation of a keyboard of a mobile communication device is provided. A keyboard operation mode signal is received from at least one of a plurality of applications executed on the mobile communication device. A keyboard operation mode is switching in accordance with the received keyboard operation mode signal in-between a first and a second mode.

In case the keyboard operation mode is switched to the first keyboard operation mode, an input mode signal and an input signal are received. An input mode is switching in accordance with the received input mode signal in-between a first and a second mode. A commands is generated in accordance with the received input signal and the current input mode. The command is a command out of a plurality of commands which comprises a first set of commands and a second set of commands. The first set of commands is generated in combination with the first input mode and represents the first assignments of the set of keys. The second set of commands is generated in combination with the second input mode and represents the second assignments of the subset of keys. The generated command is transmitted to at least one of the applications.

In case the keyboard operation mode is switched to the second keyboard operation mode, an input signal is received. A commands is generated from the received input signal. The command is a command out of a third set of commands representing the second assignments of the first selection of the portion of keys and said first assignments of the second selection of the portion of keys. The generated command is transmitted to at least one of the applications.

BRIEF DESCRIPTION OF THE DRAWINGS

The invention will be described in greater detail by the means of preferred embodiments with reference to the accompanying drawings, in which.

BEST MODE FOR CARRYING OUT THE INVENTION

Figure 1:
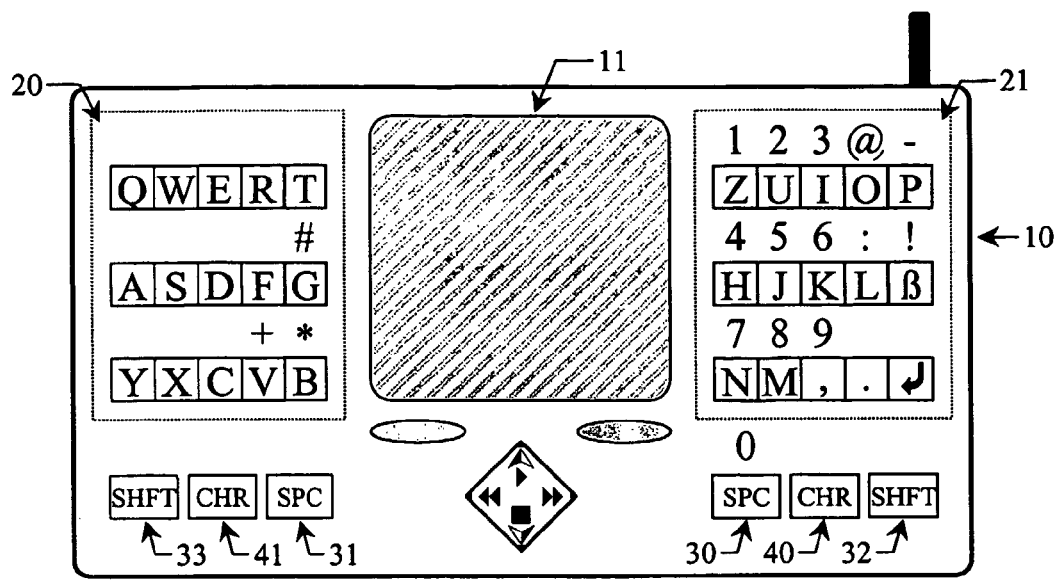
FIG. 1 shows a top view of a first mobile communication device having a keyboard according to an embodiment of the invention.

The following description relates to mobile communication device according to embodiments of the invention. Same or equal parts shown in the figures will be referred by the same reference numerals.

Figure 2:
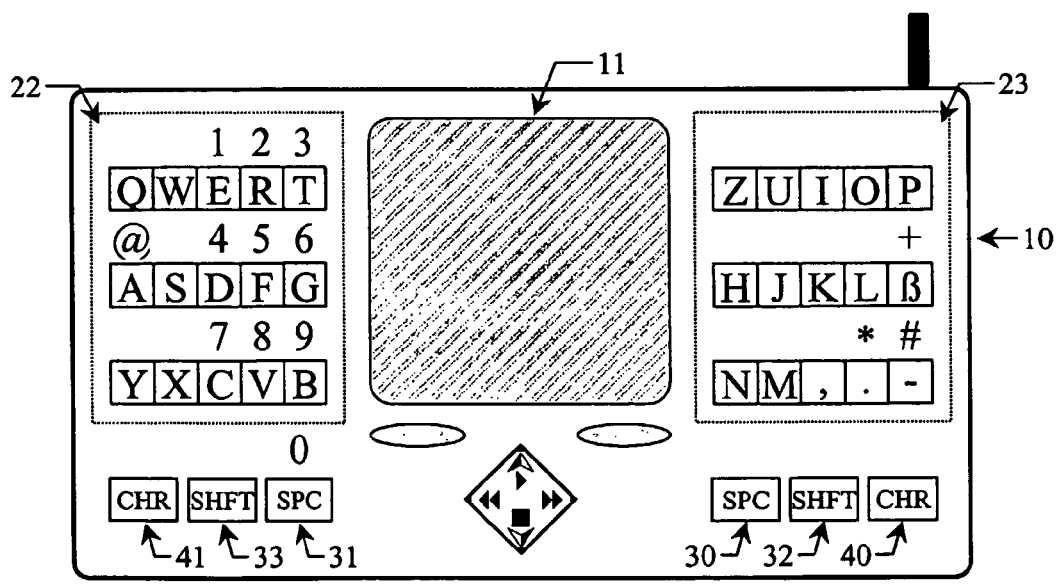
FIG. 2 shows a top view of a second mobile communication device having a keyboard according to a further embodiment of the invention.

The following FIG. 1 and FIG. 2 shows two embodiments of a mobile communication device with a keyboard according to the invention. The both illustrated keyboards of mobile communication devices differ in their use, i.e. the keyboard shown in FIG. 1 is adapted to be used by right-hander whereas the keyboard shown in FIG. 2 is adapted to be used by left-hander. The operation of the keyboards is performed in an analogous way.

FIG. 1 shows a top view of a first mobile communication device having a keyboard according to an embodiment of the invention. The depicted mobile communication device 10 is illustrated as a kind of handheld communication device. The mobile communication device 10 has a keyboard for inputting alphanumeric text. The keys of the keyboard (parts 20 and 21) are substantially arranged in accordance with a QWERTZ keyboard layout, which is a national variant of a QWERTY keyboard layout. Considerably, the QWERTZ keyboard and the QWERTY keyboard have substantially the same key arrangement expect the keys "Z" and "Y" being exchanged.

The depicted keyboard is composed of two parts 20 and 21 both arranged adjacent to a centrally arranged display 11. The inventive concept shall not be limited to a keyboard divided into two parts 20 and 21, for instance the display may also be arranged above the keyboard being one single piece. Each part 20 or 21 of the keyboard is composed of three stacked rows having five single keys each. Preferably, the keys of a row are aligned, but the keys of a row can also be arranged along a curved line.

The keys of the keyboard have at least one assignment or designation in accordance with their respective input functions, respectively. Here, the first assignments relate to the entering of character symbols correspondingly printed on the keys. Further, three additional keys 31, 33 and 41 are disposed below the part 20 and three additional keys 30, 32 and 40 are disposed below the part 21, respectively.

The keys 32 and 33 are both "SHIFT" keys (abbreviates to "SHFT") employed for switching the input of characters in-between lower-case and upper-case representation, the keys 30 and 31 are both "SPACE" keys (abbreviates to "SPC") for inputting a blank and the keys 40 and 41 are both "CHARACTER" keys (abbreviates to "CHR") for switching an input mode the employment of which will be described below. The additional keys 30, 40 and 32 and the additional keys 31, 41 and 33 are arranged symmetrically to the middle axis of the mobile communication device or the display 11, respectively, to be operable either right-handed or left-handed.

A subset of the depicted keys of the keyboard have second assignments indicated by printings arranged above the respective keys and indicating second input functions of these keys. Substantially, the second input functions relate to the entering of numbers and symbols and are operable in combination with a corresponding input mode setting which when valid causes the second input function of these keys to be operable. The keys having the first assignments "Z", "U" and "I" have additionally the second assignment "1", "2" and "3", the keys having the first assignments "H", "J" and "K" have additionally the second assignment "4", "5" and "6" and the keys having the first assignments "N", "M" and "," have additionally the second assignment "7", "8" and "9". The keys having the second assignments "1" to "9" form a rectangular number block arranged in three straight columns within the three rows of the keyboard. The second assignment "0" is assigned to the "SPACE" key 30 arranged asymmetrically to the rectangular number block.

Additional second assignments of keys are illustrated in FIG. 1. With reference to the use of the mobile communication device, the further symbols "+", "#" and "*" are of interest, since these symbols are employed in combination with the number "0" to "9" for entering telephone numbers. As shown in FIG. 1, the key having the first assignment "V" has the second assignment "+", the key having the first assignment "B" has the second assignment "*" and the key having the first assignment "G" has the second assignment "#".

The keys having the first assignment "W" and "P" have neither second assignments "0" to "9" nor second assignments "+", "#" or "*". This is, because the characters "W" and "P" are also employed for entering telephone numbers. The character "W" defines a waiting operation and the character "P" defines a pausing operation, when included into a telephone number.

At least a selection of the keys designated for entering telephone numbers, i.e. the keys having the second assignments "0" to "9", "#", "+" and "*", can be colored differently from the remaining keys in order to heighten the visible differentiation of these keys from the keyboard. Further, the "CHR" key for switching to an input mode may be colored the same in order to illustrate the combined operation. Alternatively, the printing of the second assignment may be colored differently from the printing of the first assignment for heightening the visible differentiation.

FIG. 2 shows a top view of a second mobile communication device having a keyboard according to an embodiment of the invention. The depicted mobile communication device 10 is illustrated as a kind of handheld communication device. The mobile communication device 10 has a keyboard for inputting alphanumeric text. The keys of the keyboard (parts 22 and 23) are substantially arranged in accordance with a QWERTZ keyboard layout, which is a national variant of a QWERTY keyboard layout.

The depicted keyboard is composed of two parts 22 and 23 both arranged adjacent to a centrally arranged display 11. The inventive concept shall not be limited to a keyboard divided into two parts 22 and 23, the display can also be arranged above the keyboard being one single piece. Each part 22 or 23 of the keyboard is composed of three stacked rows having five single keys each. Preferably, the keys of a row are aligned, but the keys of a row can also be arranged along a curved line.

The keys of the keyboard have at least one assignment or designation in accordance with their respective input functions, respectively. Here, the first assignments relate to the entering of character symbols correspondingly printed on the keys. Further, three additional keys 31, 33 and 41 are disposed below the part 22 and three additional keys 30, 32, and 40 are disposed below the part 23, respectively.

The keys 32 and 33 are both "SHIFT" keys (abbreviates to "SHFT") employed for switching the input of characters in-between lower-case and upper-case representation, the keys 30 and 31 are both "SPACE" keys (abbreviates to "SPC") for inputting a blank and the keys 40 and 41 are both "CHARACTER" keys (abbreviates to "CHR") for switching an input mode the employment of which will be described below. The additional keys 30, 40 and 32 and the additional keys 31, 41 and 33 arranged symmetrically to the middle axis of the mobile communication device or the display 11, respectively, to be operable either right-handed or left-handed.

A subset of the depicted keys of the keyboard have second assignments indicated by printings arranged above the respective keys and indicating second input functions of these keys. Substantially, the second input functions relate to the entering of numbers and symbols and are operable in combination with a corresponding input mode setting which when set valid makes the second input function of these keys operative. The keys having the first assignments "E", "R" and "T" have additionally the second assignment "1", "2" and "3", the keys having the first assignments "D", "F" and "G" have additionally the second assignment "4", "5" and "6" and the keys having the first assignments "C", "V" and "B" have additionally the second assignment "7", "8" and "9". The keys having the second assignments "1" to "9" form a rectangular number block arranged in three straight columns within the three rows of the keyboard. The second assignment "0" is assigned to the "SPACE" key 31 arranged asymmetrically to the rectangular number block.

Additional second assignments of keys are illustrated in FIG. 2. With reference to the use of the mobile communication device, the further symbols "+", "#" and "*" are of interest, since these symbols are employed in combination with the number "0" to "9" for entering telephone numbers. As shown in FIG. 2, the key having the first assignment "B" has the second assignment "+", the key having the first assignment "." has the second assignment "*" and the key having the first assignment "−" has the second assignment "#".

The keys having the first assignment "W" and "P" have neither second assignments "0" to "9" nor second assignments "+", "#" or "*". This is, because the characters "W" and "P" are also employed for entering telephone numbers. The character "W" defines a waiting operation and the character "P" defines a pausing operation, when included into a telephone number.

At least a selection of the keys designated for entering telephone numbers, i.e. the keys having the second assignments "0" to "9", "#", "+" and "*", can be colored differently from the remaining keys in order to heighten the visible differentiation of these keys from the keyboard. Further, the "CHR" key for switching to the input mode may be colored the same in order to illustrate the combined operation. Alternatively, the printing of the second assignment may be colored differently from the printing of the first assignment for heightening the visible differentiation.

Figure 3:
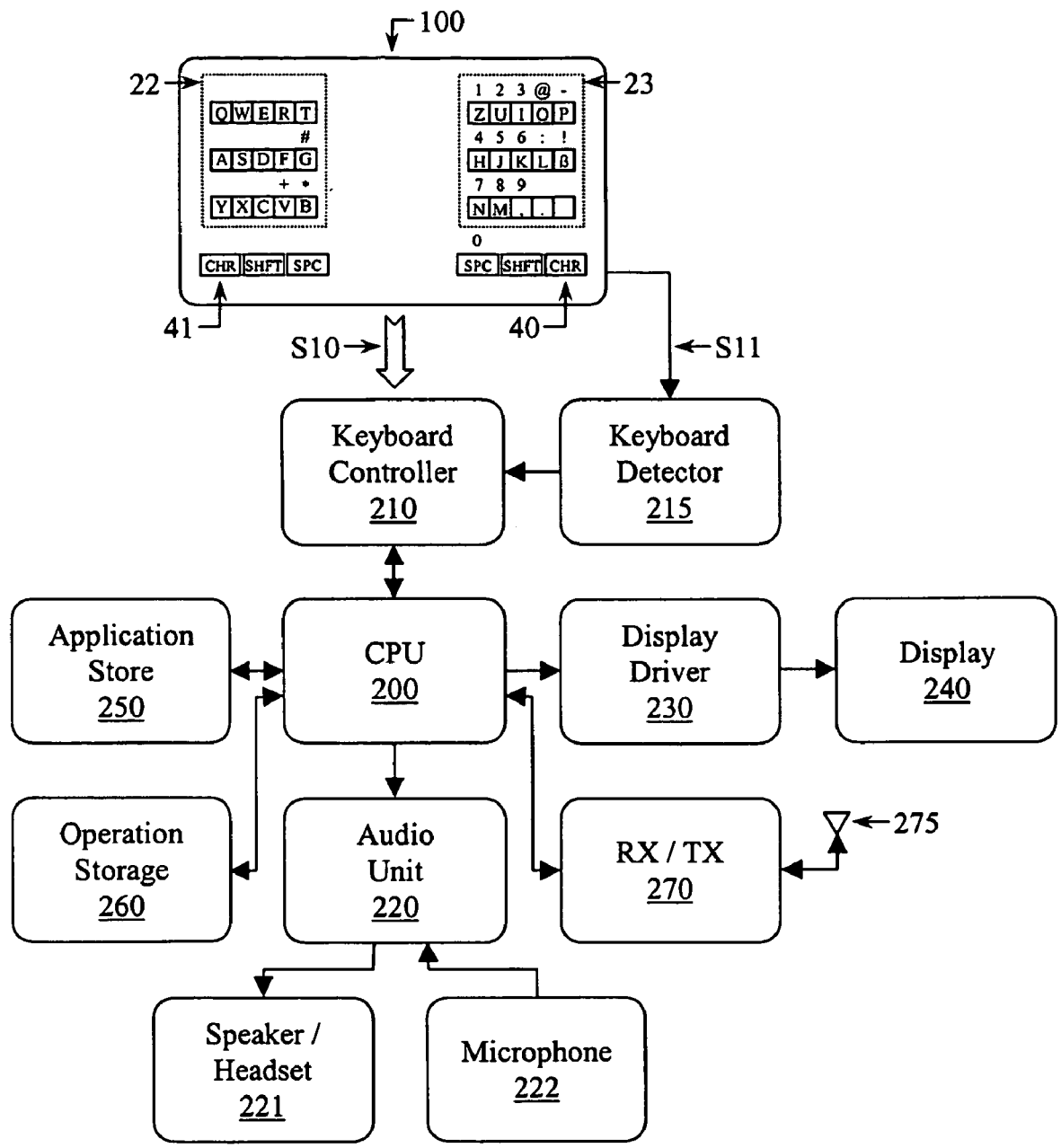
FIG. 3 shows a block diagram illustrating integrated components of a mobile communication device according to an embodiment of the invention.

FIG. 3 shows a block diagram illustrating components of a mobile communication device according to an embodiment of the invention. The depicted components include a keyboard controller 210, a keyboard detector 215, a central processing unit 200, an audio unit 220, a display driver 230 controlling a display 240, a transceiver unit (RX/TX) 270 connected to an antenna 275, an operation storage 260 and an application store 250 containing applications executed by the central processing unit 200.

The keyboard controller 210 receives electrical signals from the keys of the mobile communications device, i.e. the keys of the keyboard and the additional keys (especially the "CHARACTER" keys 40 and 41) via a signal path S10 and generates logical signals or commands, respectively. FIG. 3 illustrates the keyboard (comprising the parts 22 and 23) offered for left-handed use described in detail with reference to FIG. 2. The logical signals corresponds either to the first assignment or the second assignment of the keys in accordance with an input mode defining if the first or second assignment of the keys is valid.

The keyboard or a cover 100 including the keys of the keyboard is detachably connected to the mobile communication device, respectively. Therefore, a keyboard detector 215 assists the keyboard controller 210 to detect which kind of keyboard is connected. Preferably, the keyboard detector 215 is integrated into the keyboard controller 210. Advantageously, the detection of the keyboard is based on a direct current connection S11 supplied with resistors of different characteristics which are implemented in the detachable keyboard or detachable cover 100 and which allow to identify the connected type of keyboard. Similarly, the identification can also be based on a dedicated identification circuit implemented in the detachable keyboard or cover 100, respectively, and connected to the keyboard detector 215 via dedicated signal lines.

The generation of logical signals or commands by the keyboard controller 210 is operated in accordance with the result of the keyboard identification of the keyboard detector 215, respectively. Correspondingly, the keyboard controller 210 accesses preferably a set of keyboard mapping tables, each table being adapted to a certain keyboard layout for generating keyboard layout adapted logical signals or commands, respectively. The generated logical signals or commands are communicated to the central processing unit, respectively, executing applications requiring and/or expecting the entering of information by the keyboard.

Common status information, a user interface, application specific interfaces and further application related information are displayed via the display driver 230 and the display 240 to the user. The display driver 230 comprises adequate means for generating graphics, text, numbers and symbols on the display.

The audio unit 220 provides the connectivity to speakers, headphones and a microphone or a headset containing headphones and microphone for reproducing an audio signal and for recording an audio signal. Therefore, the audio unit 220 integrates at least amplifiers, an analog digital convert (ADC) and a digital analog converter (DAC).

The operation storage 260 allows the storage of operation relevant information. The operation relevant information comprises operating mode information, in particular information about the input mode and the device operating mode. The processing unit 200 is connected to the operation storage 260 to obtain and store such information and the processing unit 200 operates in accordance with the stored information and supplies the information to components of the mobile communication device requiring operation relevant information for operating, e.g. the keyboard controller 210.

The processing unit executes the applications of the mobile communication device contained in the application store 250. Preferably, the applications of application store 250 comprises different applications requiring and/or allowing alphanumeric and symbolic input or only numeric and symbolic input.

The operation of the keyboard in combination with applications expecting different input will be described in the following sections.

Alphanumeric and Symbolic Input; Text:

A plurality of applications allow the entering of alphanumeric and symbolic signs such as a SMS (short message service) editor or a notice editor. Further a phonebook editor expects the entering of a telephone number and at least of a name or designation, respectively. During the entering of the designation or name, respectively, alphanumeric and symbolic signs are valid for input.

During the execution of this kind of application the keyboard controller 210 is operated in a first keyboard operation mode and the keys of the mobile communication device are operated initially in a first input mode, i.e. the first assignments of the keys are initially valid. For example in case a user depresses the key "J5" (i.e. the key "J5" has the first assignment "J" and the second assignment "5") a logical signal or commands is generated in the first input mode by the keyboard controller 210 corresponding to the character "J", respectively. The user is allowed to switch from the first input mode to a second input mode and vice versa. The switching in-between the both input modes is operable with one of the "CHARACTER" keys 40 and 41, respectively. Preferably, the operation of the key 40 or 41 causes the toggling in-between the both input modes, respectively. Alternatively, the second input mode is active during depressing and holding of one of the keys 40 or 41 that means that the a key has to be operated simultaneously with the key 40 or 41 in order to enter the second assignment of the key. Correspondingly, in case a user depresses the key "J5" a logical signal or commands is generated in the second input mode by the keyboard controller 210 corresponding to the number "5". That is, a user can enter all depicted symbols of the keyboard by switching in-between the first and second input modes in case the first keyboard operation mode is valid.

It shall be noted that embodiments of the invention has been only described in view of entering upper-case letters. The "SHIFT" keys (keys 32 and 33 shown in FIG. 1 and in FIG. 2) provided by a mobile communication device according to an embodiment of the invention allows also to input lower-case and upper-case letters. The use of the "SHIFT" keys is out of the scope of the invention and state of the art so that no detailed description has been included.

Numeric and Symbolic Input; Telephone Numbers:

The symbols valid for use in telephone numbers are standardized internationally.

Telephone numbers are allowed to comprise the numbers "0" to "9". Further additional symbols cam be included in the telephone number leading to specific functions. The symbols "+", "#" and "*" as well as the signs "P" and "W" are valid, e.g. "+" replaces an explicit country code designation, the sign "P" instructs the pausing function whereas the sign "W" instructs the waiting function.

For example, a phone application expects the entering of a telephone number in order to be able to initiate the establishment of a telephone call. Further, the phonebook editor expects the entering of a telephone number. A telephone number entered in the phonebook editor application has to fulfill the above described requirements.

During the input of telephone numbers, the respective telephone number receiving application switches the keyboard controller 210 into a second keyboard operation mode or telephone number input mode, respectively. Within this second keyboard operation mode, the mobile communication device or the keyboard controller 210 of the mobile communication device generates only logical signals on operation of valid input keys, respectively. Additionally, the keyboard controller 210 switches automatically if necessary the input mode to the first or second assignment of the valid keys. The valid input keys have the aforementioned assignments, i.e. the numbers "0" to "9", the symbols "#", "+" and "*" as well as the signs "P" and 'For example, in case a user operates the key "J5" in the second keyboard operation mode, a logical signal corresponding to the number "5" is generated by the keyboard controller 210 and transmitted to the respective application expecting this input. Further, in case a user operates the key "G#" in the second keyboard operation mode, a logical signal corresponding to the symbol "#" is generated and transmitted. Additionally, in case a user operates the key "P–" in the second keyboard operation mode, a logical signal or command corresponding to the sign "P" is generated and transmitted, respectively. The keys are selectively switched to the first and second assignment of the keys, whereas the operation of keys having assignments which are not included in the valid set of telephone numbers, symbols and signs do not cause a generating of logical signals or commands, respectively, to be transmitted to the executed application which has activated the second keyboard operation mode.

Conveniently, the second keyboard operation mode can not be switched by a user operation into another input mode. The switching of the input modes is only allowed and available to a user in the first keyboard operation mode of the mobile communication device or the keyboard controller 210, respectively.

The keyboard controller 210, the keyboard detector 215, the audio unit 220, the transceiver 270, the display driver 230, the application store 250 and the operation storage 260 may be constituted by a data processing component or a hardware circuit within the mobile communication device. Further, the keyboard controller 210, the keyboard detector 215, the display driver 230 and the applications may be constituted by a code section for executing on the mobile communication device or the processing unit 200 containing instructions for carrying out the necessary processing operations. Moreover, keyboard controller 210, the keyboard detector 215, the audio unit 220, the transceiver 270, the display driver 230, the application store 250 and the operation storage 260 may be constituted by a portion of the mobile communication device. Additionally, the keyboard controller 210, the keyboard detector 215, the audio unit 220, the transceiver 270, the display driver 230, the application store 250 and the operation storage 260 may be constituted by hybrid system comprising a data processing component or a hardware circuit and a code section for executing on the mobile device containing instructions for carrying out the necessary processing operations in combination with the data processing component or a hardware circuit.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in the matter of the structure and arrangements of parts within the principles of the present invention to the full extent indicated by the broad general meaning of the terms in which the appended claims are expressed. For example, the particular elements may vary depending on the particular application for the mobile communication device while maintaining substantially the same functionality without departing from the scope and the spirit of the present invention. Further, although the invention has been illustrated as implemented in a circuit block diagram, those skilled in the art will recognize that the invention may be implemented in any hardware, software or hybrid systems.

The invention claimed is:

1. A mobile communication device, comprising:
   a set of keys organized as a keyboard, wherein each key of said set of keys has a first assigned function for entering alphanumeric text;
   at least a subset of keys included in said set of keys and arranged in a pre-determined configuration, wherein each key of said subset has a second assigned function for entering alphanumeric text;
   a first selection of keys provided for entering numbers and telephone number related symbols in accordance with said second assigned function, wherein said first selection of keys is compressed by said subset of keys;
   a second selection of keys provided for entering control letters in accordance with said first assigned function, wherein said control letters have control functions in relationship with dialing of a telephone number, wherein said second selection of said keys is comprised by said set of keys;
   at least one of a plurality of applications executable on said mobile communication device and adapted to switch a keyboard operation mode into a first mode and into a second mode;
   wherein said set of keys is operable with said keyboard operation mode being in said first mode;
   wherein said first selection of keys and said second selection of keys are operable with said keyboard operation mode being in said second mode;
   a mode selecting key for switching an input mode into a first mode and into a second mode, said mode selecting key being operable to change modes in at least one of said plurality of applications;
   wherein while said keyboard operation mode is in said first mode:
   said set of keys each having a first assigned function is operable with said input mode being in said first mode; and
   said subset of keys each having a second assigned function is operable with said input mode being in said second mode;
   a keyboard controller adapted to receive signals from said keyboard and signals from said mode selecting key, and adapted to generate commands in accordance with said received signals and able to transmit said commands to at least one of said plurality of applications;
   a first set of commands is provided operable with said input mode being in said first mode and said keyboard operation mode being in said first mode, said first set of commands representing said first assigned function of said set of keys;
   a second set of commands is provided operable with said input mode being in said second mode and said keyoard operation mode being in said first mode, said second set of commands representing said first assigned function of said set of keys, wherein in case said keyboard operation mode is in said second mode:
   a third set of commands is provided, said third set of commands representing said second assigned functions of said first selection of keys and representing said first assigned functions of said second selection of keys.

2. Method for controlling an operation of a keyboard of a mobile communication device, characterized by:
   receiving a keyboard operation mode signal from at least one of a plurality of applications executable on the mobile communication device;
   switching a keyboard operation mode into a first mode and into a second mode in accordance with said received keyboard operation mode signal; in case said keyboard operation mode is in said first mode:
   receiving an input mode signal;
   switching an input mode into a first mode and into a second mode in accordance with said received input mode signal;
   receiving an input signal;
   generating a command from said received input signal in combination with said input mode, said command being one of a plurality of commands including a first set of commands generated in said input mode being in said first mode and a second set of commands generated in said input mode being in said second mode, said first set of commands representing first assigned functions of a set of keys of said keyboard, said second set of commands representing second assigned functions of a subset of keys of said keyboard; and
   transmitting said generated command to at least one of said plurality of applications;
   in case said keyboard operation mode is in said second mode:
   receiving an input signal;
   generating a command from said received input signal, said command being one out of a third set of commands; said third set of commands representing said second assigned functions of a first selection of keys of said subset of keys and said first assigned functions of a second selection of keys of said set of keys; and
   transmitting said generated command to at least one of said plurality of applications.

3. A mobile communication device, comprising:
   a set of keys organized as a keyboard, said set of keys each having a first assigned function for entering alphanumeric text;
   wherein at least a subset of keys included in said set of keys is arranged in a pre-determined configuration, keys of said subset each having a second assigned function for entering alphanumeric text; and
   a plurality of applications executable on said mobile communication device; characterized in that
   a portion of said keys comprises a first selection of keys of said subset of keys and a second selection of keys of said set of keys,
   wherein said first selection of keys is provided for entering numbers and telephone number related symbols in accordance with said second assigned function,
   wherein said second selection of keys is provided for entering control letters in accordance with said first assigned function, said control letters having a control function in relationship with the entering of telephone numbers;
   at least one of said plurality of applications is adapted to switch a keyboard operation mode into a first mode and into a second mode;
   said set of keys and said at least one subset of keys included in said set of keys are operable with said keyboard operation mode being in said first mode;

said portion of keys is operable with said keyboard operation mode being in said second mode;

a mode selecting key for switching an input mode into a first mode and into a second mode, said mode selecting key being operable to change modes in at least one of said plurality of applications;

wherein while said keyboard operation mode is in said first mode:

said set of keys each having a first assigned function is operable with said input mode being in said first mode; and said subset of keys each having a second assigned function is operable with said input mode being in said second mode; said device further comprising:

a keyboard controller adapted to receive signals from said keyboard and signals from said mode selecting key, and adapted to generate commands in accordance with said received signals and able to transmit said commands to at least one of said plurality of applications;

a first set of commands is provided operable with said input mode being in said first mode and said keyboard operation mode being in said first mode, said first set of commands representing said first assigned function of said set of keys; and a second set of commands is provided operable with said input mode being in said second mode and said keyboard operation mode being in said first mode, said second set of commands representing said first assigned function of said set of keys;

wherein in case said keyboard operation mode is in said second mode:

a third set of commands is provided, said third set of commands representing said second assigned functions of said first selection of keys and representing said first assigned functions of said second selection of keys.

4. Device for controlling an operation of a keyboard of a mobile communication device, comprising:

means for receiving a keyboard operation mode signal from at least one of a plurality of applications executable on the mobile communication device;

means for switching a keyboard operation mode into a first mode and into a second mode in accordance with said received keyboard operation mode signal;

in case said keyboard operation mode is in said first mode:

means for receiving an input mode signal;

means for switching an input mode into a first mode and into a second mode in accordance with said received input mode signal;

means for receiving an input signal;

means for generating a command from said received input signal in combination with said input mode, said command being one of a plurality of commands including a first set of commands generated in said input mode being in said first mode and a second set of commands generated in said input mode being in said second mode, said first set of commands representing first assigned functions of a set of keys of said keyboard, said second set of commands representing second assigned functions of a subset of keys of said keyboard; and means for transmitting said generated command to at least one of said plurality of applications; in case said keyboard operation mode is in said second mode:

means for receiving an input signal;

means for generating a command from said received input signal, said command being one out of a third set of commands; said third set of commands representing said second assigned functions of a first selection of keys of said subset of keys and said first assigned functions of a second selection of keys of said set of keys; and means for transmitting said generated command to at least one of said plurality of applications.

* * * * *